(12) United States Patent
Shaw et al.

(10) Patent No.: US 10,887,130 B2
(45) Date of Patent: Jan. 5, 2021

(54) DYNAMIC INTELLIGENT ANALYTICS VPN INSTANTIATION AND/OR AGGREGATION EMPLOYING SECURED ACCESS TO THE CLOUD NETWORK DEVICE

(71) Applicant: AT&T Intellectual Property I, L.P., Atlanta, GA (US)

(72) Inventors: Venson Shaw, Kirkland, WA (US); Sangar Dowlatkhah, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 342 days.

(21) Appl. No.: 15/624,170

(22) Filed: Jun. 15, 2017

(65) Prior Publication Data
US 2018/0367340 A1    Dec. 20, 2018

(51) Int. Cl.
*H04L 12/24*    (2006.01)
*H04L 12/46*    (2006.01)
*H04L 29/06*    (2006.01)

(52) U.S. Cl.
CPC ...... *H04L 12/4641* (2013.01); *H04L 12/4633* (2013.01); *H04L 63/0272* (2013.01); *H04L 63/107* (2013.01)

(58) Field of Classification Search
CPC . H04L 12/46; H04L 12/4641; H04L 12/4633; H04L 63/107; H04L 63/0272
(Continued)

(56) References Cited

U.S. PATENT DOCUMENTS 6,275,496 B1    8/2001  Burns et al.
6,636,898 B1    10/2003 Ludovici et al.
(Continued)

FOREIGN PATENT DOCUMENTS

WO    2013103959 A2    7/2013
WO    2014066820 A2    5/2014
(Continued)

OTHER PUBLICATIONS

Office Action dated Nov. 14, 2018 for U.S. Appl. No. 14/723,841, 38 pages.
(Continued)

*Primary Examiner* — Moustafa M Meky
*Assistant Examiner* — Elizabeth Kassa
(74) *Attorney, Agent, or Firm* — Amin, Turocy & Watson, LLP

(57) ABSTRACT

Dynamic intelligent analytics VPN instantiation and/or aggregation facilitating secured access to the cloud network device are provided herein. A system can comprise: a processor; and a memory that stores executable instructions that, when executed by the processor, facilitate performance of operations, comprising: identifying an application for execution on a user device of user devices connected to first network devices of a first network, wherein the system is part of second devices of a second network communicatively coupled to and remote from the first network; and determining virtual private network attributes for a virtual private network for the user device, wherein the virtual private network attributes are based on the application; and generating a message notification to send to the user device, wherein the message notification comprises the virtual private network attributes to enable the user device to update the virtual private network.

20 Claims, 10 Drawing Sheets

(58) Field of Classification Search
USPC .......................................................... 709/223
See application file for complete search history.

(56) References Cited

U.S. PATENT DOCUMENTS

| | | | |
|---|---|---|---|
| 6,944,183 B1 | 9/2005 | Iyer et al. | |
| 7,024,470 B2* | 4/2006 | Bellinger | G06F 9/4411 |
| | | | 709/220 |
| 7,197,550 B2 | 3/2007 | Cheline et al. | |
| 7,209,479 B2 | 4/2007 | Larson | |
| 7,526,480 B2 | 4/2009 | Nadeau et al. | |
| 7,565,689 B2 | 7/2009 | Brown et al. | |
| 7,818,409 B2 | 10/2010 | Chandrashekhar et al. | |
| 7,941,762 B1 | 5/2011 | Tovino et al. | |
| 8,014,283 B2 | 9/2011 | Gibson et al. | |
| 8,019,850 B2 | 9/2011 | Jalava | |
| 8,095,786 B1 | 1/2012 | Kshirsagar et al. | |
| 8,272,046 B2 | 9/2012 | Gundavelli et al. | |
| 8,433,802 B2 | 4/2013 | Head et al. | |
| 8,503,453 B2 | 8/2013 | Asati et al. | |
| 8,533,780 B2 | 9/2013 | Parla et al. | |
| 8,539,544 B2* | 9/2013 | Garimella | H04L 63/0823 |
| | | | 713/156 |
| 8,601,471 B2 | 12/2013 | Beaty et al. | |
| 8,627,328 B2 | 1/2014 | Mousseau et al. | |
| 8,719,898 B1 | 5/2014 | Barton et al. | |
| 8,805,983 B2 | 8/2014 | Dube et al. | |
| 8,832,710 B2 | 9/2014 | Mousseau et al. | |
| 8,832,790 B1* | 9/2014 | Villa | H04L 63/123 |
| | | | 726/2 |
| 8,862,883 B2 | 10/2014 | Cherukuri et al. | |
| 8,977,679 B2 | 3/2015 | Van Biljon et al. | |
| 9,043,278 B1 | 5/2015 | Wilson et al. | |
| 9,185,075 B2 | 11/2015 | Ke et al. | |
| 9,350,710 B2 | 5/2016 | Retie et al. | |
| 9,444,789 B2 | 9/2016 | Cherukuri et al. | |
| 9,521,117 B2 | 12/2016 | Barton et al. | |
| 9,571,457 B1 | 2/2017 | Hoy et al. | |
| 2002/0083148 A1 | 6/2002 | Shaw et al. | |
| 2003/0028674 A1* | 2/2003 | Boden | H04L 63/0227 |
| | | | 709/250 |
| 2004/0243487 A1 | 12/2004 | Tien et al. | |
| 2005/0088977 A1 | 4/2005 | Roch et al. | |
| 2006/0045053 A1 | 3/2006 | Erlich et al. | |
| 2006/0070115 A1* | 3/2006 | Yamada | H04L 63/08 |
| | | | 726/3 |
| 2006/0143702 A1* | 6/2006 | Hisada | H04L 12/4641 |
| | | | 726/15 |
| 2006/0288099 A1 | 12/2006 | Jefferson et al. | |
| 2007/0245310 A1 | 10/2007 | Rosenstein et al. | |
| 2008/0046994 A1* | 2/2008 | Venkatraman | H04L 63/0272 |
| | | | 726/15 |
| 2008/0301175 A1 | 12/2008 | Applebaum et al. | |
| 2010/0125477 A1 | 5/2010 | Mousseau et al. | |
| 2011/0270721 A1 | 11/2011 | Kusterer | |
| 2012/0005746 A1 | 1/2012 | Wei et al. | |
| 2012/0113989 A1* | 5/2012 | Akiyoshi | H04L 45/02 |
| | | | 370/392 |
| 2012/0174184 A1 | 7/2012 | Hyndman et al. | |
| 2012/0246647 A1 | 9/2012 | Ciano et al. | |
| 2012/0260314 A1* | 10/2012 | Babula | H04L 63/0272 |
| | | | 726/3 |
| 2012/0311571 A1 | 12/2012 | Morgan | |
| 2013/0054005 A1 | 2/2013 | Stevens et al. | |
| 2013/0055202 A1 | 2/2013 | Dudek et al. | |
| 2013/0082920 A1 | 4/2013 | You et al. | |
| 2013/0166703 A1 | 6/2013 | Hammer et al. | |
| 2013/0227089 A1 | 8/2013 | McLeod et al. | |
| 2013/0246589 A1 | 9/2013 | Klemba et al. | |
| 2013/0346569 A1 | 12/2013 | Smith et al. | |
| 2014/0019471 A1 | 1/2014 | Linton et al. | |
| 2014/0040978 A1* | 2/2014 | Barton | H04L 63/20 |
| | | | 726/1 |
| 2014/0109174 A1* | 4/2014 | Barton | H04W 12/0027 |
| | | | 726/1 |
| 2014/0130036 A1 | 5/2014 | Gurikar et al. | |
| 2014/0307556 A1 | 10/2014 | Zhang | |
| 2014/0317293 A1 | 10/2014 | Shatzkamer | |
| 2014/0328190 A1 | 11/2014 | Lord et al. | |
| 2014/0331078 A1 | 11/2014 | Cohen | |
| 2014/0337531 A1 | 11/2014 | Naseh et al. | |
| 2014/0351390 A1 | 11/2014 | Madani et al. | |
| 2014/0351623 A1 | 11/2014 | Baird | |
| 2014/0359001 A1 | 12/2014 | Dupoteau | |
| 2014/0362700 A1 | 12/2014 | Zhang | |
| 2014/0376406 A1 | 12/2014 | Kim et al. | |
| 2015/0058467 A1 | 2/2015 | Douglas et al. | |
| 2015/0058508 A1 | 2/2015 | Nguyen et al. | |
| 2015/0066571 A1 | 3/2015 | Balko | |
| 2015/0067394 A1 | 3/2015 | Naseh et al. | |
| 2015/0067604 A1 | 3/2015 | Naseh et al. | |
| 2016/0057004 A1 | 2/2016 | Ge | |
| 2016/0173535 A1* | 6/2016 | Barabash | H04L 63/20 |
| | | | 726/1 |
| 2016/0261564 A1 | 9/2016 | Foxhoven et al. | |
| 2017/0099159 A1* | 4/2017 | Abraham | H04L 43/08 |
| 2017/0118174 A1* | 4/2017 | Mathur | H04L 12/4641 |
| 2017/0359311 A1* | 12/2017 | Chen | H04L 63/0236 |
| 2018/0367340 A1* | 12/2018 | Shaw | H04L 63/0272 |
| 2019/0058694 A1* | 2/2019 | Hussain | H04L 67/2819 |

FOREIGN PATENT DOCUMENTS

| | | |
|---|---|---|
| WO | 2014169289 A1 | 10/2014 |
| WO | 2014209007 A1 | 12/2014 |
| WO | 2015007331 A1 | 1/2015 |

OTHER PUBLICATIONS

Office Action dated Apr. 23, 2018 for U.S. Appl. No. 14/723,841, 43 pages.

Bouten, et al., "Towards NFV-based Multimedia Delivery," Ghent University, [http://www.maps.upc.edu/rashid/files/IM2015Niels.pdf], retrieved on Mar. 29, 2015, 4 pages.

Cisco Evolved Services Platform Automating a New Class of Carrier Cloud Services, Cisco, [http://www.cisco.com/c/en/us/solutions/collateral/service-provider/service-providerstrategy/brochure-c02-731348.html], retrieved on Mar. 25, 2015, 6 Pages.

Clougherty, et al., "The Role of SDN in IP Network Evolution," Bell Labs, [http://www.bell-labs.com/newsroom/publications/294147/], retrieved on Mar. 29, 2015, 20 pages.

Grigoras, et al., "The Distributed Mobile Cloud Supporting the Internet of Things," 14th International Symposium on Parallel and Distributed Computing (ISPDC), 2015, IEEE, 8 pages.

Kloeckner, "Cloud Computing for a Smarter Planet," VP Strategy & Enterprise Initiatives, Systems & Software, and CTO, Cloud Computing, Oct. 2010, IBM, 56 pages.

Morgan, "TfL Enterprise Geospatial Platform," The Open Group Enterprise Architecture Practitioners Conference, 2008, Spatial Consultants Ltd, United Kingdom, [www.spatialconsultants.com/case_studies/tfl-enterprise-geospatial-platform], retrieved on Mar. 25, 2015, 1 page.

Mule ESB, MuleSoft, Inc., [https://www.mulesoft.com/platform/soa/mule-esb-open-source-esb], retrieved on Mar. 25, 2015, 8 Pages.

Notice of Allowance dated Aug. 29, 2017 for U.S. Appl. No. 14/748,166, 15 pages.

Office Action dated Jun. 2, 2017 for U.S. Appl. No. 14/723,841, 26 pages.

Office Action dated Aug. 8, 2017 for U.S. Appl. No. 14/723,841, 32 pages.

Office Action dated Jan. 10, 2017 for U.S. Appl. No. 14/723,841, 29 pages.

Office Action dated Oct. 4, 2016 for U.S. Appl. No. 14/748,166, 27 pages.

Office Action dated May 3, 2017 for U.S. Appl. No. 14/748,166, 25 pages.

Office Action dated Jul. 6, 2016 for U.S. Appl. No. 14/723,841, 33 pages.

(56) References Cited

OTHER PUBLICATIONS

Quintero, et al., "IBM Platform Computing Solutions for High Performance and Technical Computing Workloads," International Technical Support Organization, Jun. 2015, 27 pages.

Sripanidkulchai, et al., "A Business-Driven Framework for Evaluating Cloud Computing," 7th Workshop on Business Driven IT Management (BDIM), 2012, pp. 1335-1342, IEEE, 8 pages.

Columbus, "Roundup of Cloud Computing Forecasts and Market Estimates," 2014, Forbes.com, 17 pages. https://www.forbes.com/sites/louiscolumbus/2014/03/14/roundup-of-cloud-computing-forecasts-and-market-estimates-2014/#7309614657a2.

Office Action dated Jun. 27, 2019 for U.S. Appl. No. 14/723,841, 44 pages.

Final Office Action received for U.S. Appl. No. 14/723,841 dated Jan. 8, 2020, 58 pages.

\* cited by examiner

DYNAMIC INTELLIGENT ANALYTICS VPN INSTANTIATION AND/OR AGGREGATION EMPLOYING SECURED ACCESS TO THE CLOUD NETWORK DEVICE

TECHNICAL FIELD

The subject disclosure relates generally to virtual private networks (VPNs), and to dynamic intelligent analytics VPN instantiation and/or aggregation systems, apparatuses, methods and machine-readable storage devices facilitating secured access to the cloud network device.

BACKGROUND

Currently the lead time to establishment of a service is too great and too costly. For example, lead time can be up to 18 months and can result in a capital and operational expenditure of millions of dollars. Further, the result can be a limited and rigid framework with little to no space for service expansion. Due to the lead time and financial risk, creating services that could appeal to different segments of markets is difficult. In a conventional situation, the fundamental functions and network elements must typically be created (or the functions and/or network elements that already exist must be augmented), and connection to customer entity premises must typically be created or expanded via physical visit to the customer entity location by installation personnel. Further, if possible, proprietary equipment in the customer entity network must be located to accommodate the service to be implemented. To create a virtual private network (VPN) connection to customer entity premises can take between six and nine months, which is unacceptable with today's fast pace of development.

Further, there are numerous business opportunities and/or significant positive financial impacts to cloud computing. Cloud computing has proven to be not only a disruptive technology, but also an incredibly fast-growing and lucrative technology. Current predictions indicate that by 2017, enterprise spending on cloud computing will be $235.1 billion, which is triple the $78.2 billion spent in 2011.

It is forecasted there will soon to be hundreds of billions of users requesting access to a cloud network. However, conventional cloud network access solutions are extremely primitive. These conventional solutions do not provide for VPN instantiation and/or aggregation as the most secured access to the cloud network, do nor provide for updating application-specific VPN according to changes in user behavior and/or preferences and the like.

DETAILED DESCRIPTION

Figure 1:
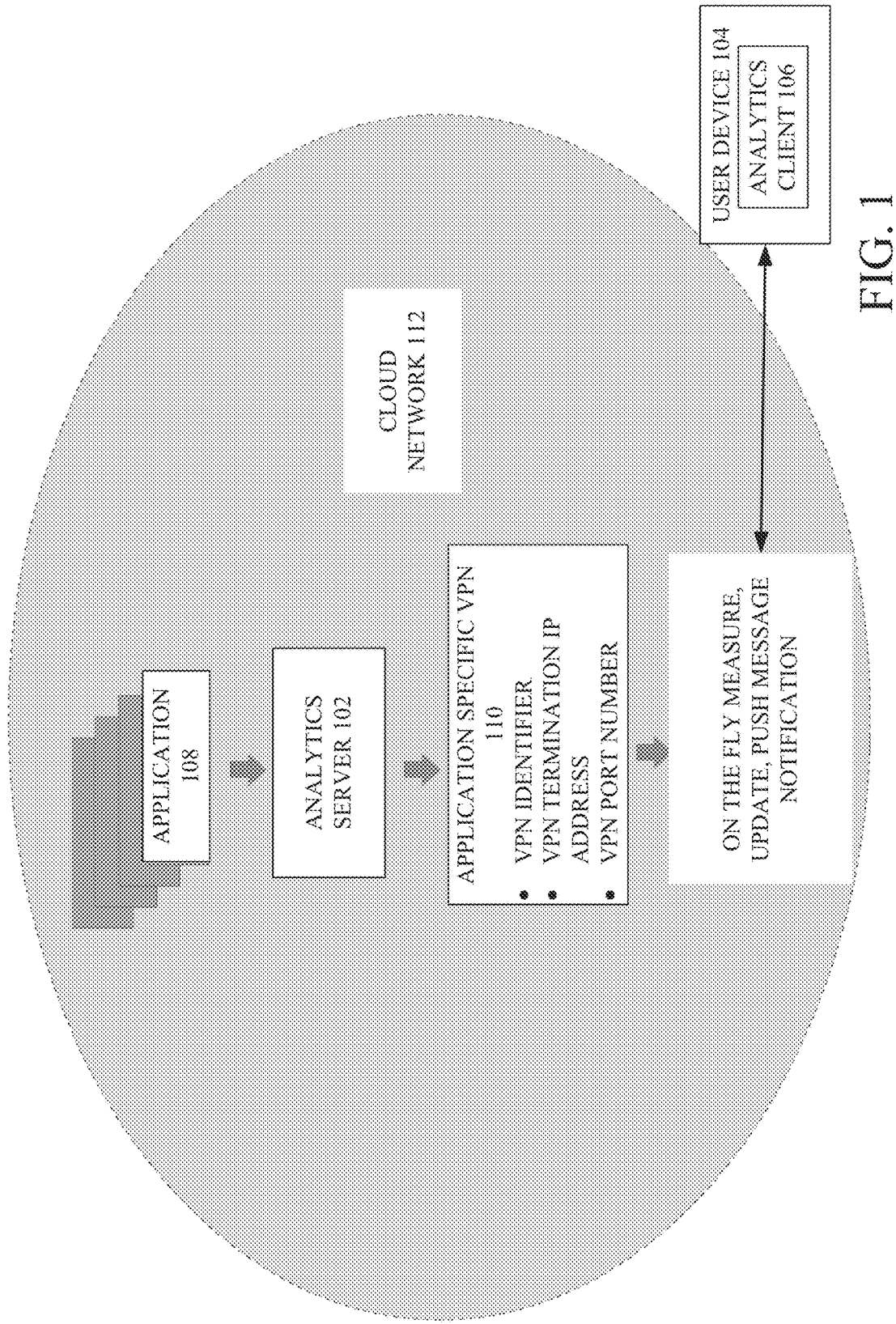
FIG. 1 illustrates an example schematic diagram of a system that facilitates dynamic VPN instantiation, aggregation and/or secured access to the cloud network device in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

Currently the lead time to establishment of a service is too great and too costly. For example, lead time can be up to 18 months and can result in a capital and operational expenditure of millions of dollars. Further, the result can be a limited and rigid framework with little to no space for service expansion. Due to the lead time and financial risk, creating services that could appeal to different segments of markets is difficult. In a conventional situation, the fundamental functions and network elements must typically be created (or the functions and/or network elements that already exist must be augmented), and connection to customer entity premises must typically be created or expanded via physical visit to the customer entity location by installation personnel. Further, if possible, proprietary equipment in the customer entity network must be located to accommodate the service to be implemented. To create a virtual private network (VPN) connection to customer entity premises can take between six and nine months, which is unacceptable with today's fast pace of development.

Further, there are numerous business opportunities and/or significant positive financial impacts to cloud computing. Cloud computing has proven to be not only a disruptive technology, but also an incredibly fast-growing and lucrative technology. Current predictions indicate that by 2017, enterprise spending on cloud computing will be $235.1 billion, which is triple the $78.2 billion spent in 2011.

It is forecasted there will soon to be hundreds of billions of users requesting access to a cloud network. However, conventional cloud network access solutions are extremely primitive. These conventional solutions do not provide for VPN instantiation and/or aggregation as the most secured access to the cloud network, do nor provide for updating application-specific VPN according to changes in user behavior and/or preferences and the like.

Various embodiments can include systems, apparatus, methods and/or machine-readable storage media that facilitate dynamic intelligent analytics VPN instantiation, aggregation and/or secure access to the cloud network device. In one embodiment, a system is provided. The system can comprise a memory that stores executable instructions; and a processor, coupled to the memory, that facilitates execution of the executable instructions to perform operations. The operations can comprise: identifying an application for execution on a user device of user devices connected to first network devices of a first network, wherein the system is part of second devices of a second network communicatively coupled to and remote from the first network; determining virtual private network attributes for a virtual private network for the user device, wherein the virtual private network attributes are based on the application; and generating a message notification to send to the user device, wherein the message notification comprises the virtual private network attributes to enable the user device to update the virtual private network.

In another embodiment, a method comprises: determining, by an analytics application of a device comprising a processor, user behavior for a user device associated with the analytics application and for which a virtual private network between the user device and network applications of a network is desired; transmitting, by the analytics application, information indicative of the user behavior and a request for the virtual private network for the user device; and receiving, by the analytics application, virtual private network attributes for instantiation of the virtual private network requested by the analytics application for the user device, wherein the virtual private network attributes are specific to the user behavior of the user device.

In some embodiments, a machine-readable storage medium is provided. The machine-readable storage medium comprises executable instructions that, when executed by a processor, facilitate performance of operations, comprising: determining application-specific virtual private network attributes for a virtual private network for a user device, wherein the virtual private network is between the user device and a network device that facilitates enabling execution of an application on the user device, and wherein the determining is based on a location of the user device, and a quality of service specification for the execution of the application over the virtual private network; and generating a message notification for the user device to establish the virtual private network, wherein the message notification comprises the application-specific virtual private network attributes.

One or more embodiments can reduce data traffic back to the network by 70%-80%, facilitate on demand deployment of new services and/or augmentation of existing services, and/or facilitate reduction of the amount of capital and operating expenditures by virtualization of an entire ESP as software running on off-the-shelf or specialized hardware.

One or more embodiments described herein can facilitate application-specific VPN instantiation and/or aggregation. One or more embodiments can facilitate for an analytics server and user device to instantiate an application-specific VPN. One or more embodiments can facilitate the analytics client on the user device continually collecting and/or updating itself based on user behavior and/or preference information (e.g., based on location, time of day and/or application (e.g., NETFLIX® versus voice over Internet Protocol (VoIP), etc.).

One or more embodiments can facilitate the intelligent analytics server in the cloud network device continually measuring and/or dynamically updating the application-specific VPN attributes (e.g., VPN identifier, VPN termination IP address and/or VPN port number). One or more embodiments can facilitate the intelligent analytics server in the cloud network device continually sending notification messages to the analytics client on the user device (in which the notification message can comprise a VPN identifier, a VPN termination IP address, and/or a VPN port number). One or more embodiments can facilitate the analytics user device determining measurements in combination with the intelligent analytics server to dynamically instantiate the application-specific VPN between the user device and the cloud network device. One or more embodiments can facilitate the analytics user device determining measurements in combination with the intelligent analytics server to dynamically modify the application-specific VPN between the user device and cloud network device according to a change of user behavior and/or preference (e.g., based on location, time of day, and/or application).

Turning now to the drawings, FIG. 1 illustrates an example schematic diagram of a system that facilitates dynamic VPN instantiation, aggregation and/or secured access to the cloud network device in accordance with one or more embodiments described herein. As shown in FIG. 1, a cloud network 112 can include an analytics server 102 that can receive information about an application 108 that the user device 104 plans to execute and/or is executing. The user device 104 can include or be communicatively coupled to an analytics client 106 that can determine user behavior for the user device 104 and/or preference information for the user device 104 and/or the user of the user of the user device 104.

The analytics server 102 can generate one or more parameter values for attributes of a VPN that can be established between the user device 104 and the cloud network 112. For example, in some embodiments, the parameter values can be parameter values of one or more of the following attributes: VPN identifier, VPN termination IP address and/or VPN port number. The parameter values can be transmitted to the user device 104 for instantiation of the VPN. The analytics server 102 can measure and/or update the VPN attributes and push/transmit a message notification including the one or more parameter values to the user device 104. Because the user behavior and/or preference information employed by the analytics server 102 is based on or takes into account the application that will be executed on, or that is being executed on, the user device, the analytics server 102 is correspondingly instantiating an application-specific VPN between the user device 104 and the cloud network 112 (as opposed to implementing a general VPN that is application-agnostic).

In some embodiments, system 100 can provide dynamic analytics based instantiation and/or aggregation of VPN in a manner that facilitates secure access to the cloud device. In some embodiments, each (or, in some embodiments, one or more) of the one or more user devices are associated with one or more respective users that have various user behavior and/or user preferences. The system 100 can update the user behavior and/or preference of the user device based on one or more criteria. By way of example, but not limitation, the criteria can include, but is not limited to, location, time of day and/or application. For example, the application can be or include NETFLIX and/or VoIP.

The user device 104 can comprise an analytics client 106 in some embodiments. The user device 104 can collect user behavior and/or preference information and can send the collected user behavior and/or preference information to the analytics client. In some embodiments, each application can comprise specific service requirements (e.g., performance, quality of service (QoS), data rate, etc). The analytics server 102 in the cloud network 112 can continually communicate with the analytics client 106 in the user device 104 to determine, receive and/or collect user behavior and/or preference information according to location, time of day and/or application.

In some embodiments, selective user devices can request an application in the cloud. The user devices can launch an application request on behalf of a user of user device. The user device 104 can collect user behavior information and send the user behavior information to the analytics client 106.

The analytics client 106 can send user preference information to the analytics server. The analytics client 106 can send service information and user behavior and/or preference information to the analytics server 102. The analytics server is in the cloud in some embodiments. The analytics server 102 can measure user behavior and/or preference according to location, time of day, application and/or application service specific requirements (e.g., performance, QoS, bit rate, etc).

In some embodiments, the analytics server 102 can instantiate a VPN virtual network function, which can automatically assign and/or allocate selective VPN attributes for each service request (or, in some embodiments, one or more service requests). The VPN attributes assigned and/or allocated can include, but is not limited to, VPN identifier, VPN termination IP address and/or VPN port number.

The analytics server 102 can send a VPN notification message to the corresponding analytics client 106 residing on the user device 104. In some embodiments, the VPN notification message can comprise a selective VPN attribute for each service request (the VPN attributes can include, but are not limited to, VPN identifier, VPN termination IP address, and/or VPN port number).

The analytics client 106 can launch an application-specific VPN on behalf of the user device 104. The analytics client 106 can allow a user device 104 reach to the cloud network 112 according to the specific user behavior preference and service application requirement according to location, time of day and/or application.

The analytics client 106 can pair with the analytics server 102 in the cloud network 112 and can continually modify the application-specific VPN for each service request (or for one or more service request) based on user behavior change and/or application performance can update VPN identifier, VPN termination IP address, and/or VPN port number Accordingly, system 100 can provide application-specific VPN instantiation and/or aggregation. One or more embodiments can provide an analytics server and analytics client to instantiate application-specific VPN. The analytics client 106 on the user device 104 to continually collect and/or update user behavior and preference information based on the location, time of day and/or application (NetFlix vs VoIP, etc.). One or more embodiments can include an analytics server 102 in the cloud network 112 and that can continually measure and/or dynamically update the application-specific VPN attributes of VPN identifier, VPN termination IP address, and/or VPN port number One or more embodiments can include an analytics server 102 in the cloud network 112 to continually send notification messages to the analytics client 106 on the user device 104. In various embodiments, the notification message can comprise VPN identifier, VPN termination IP address, and/or VPN port number.

Figure 2:
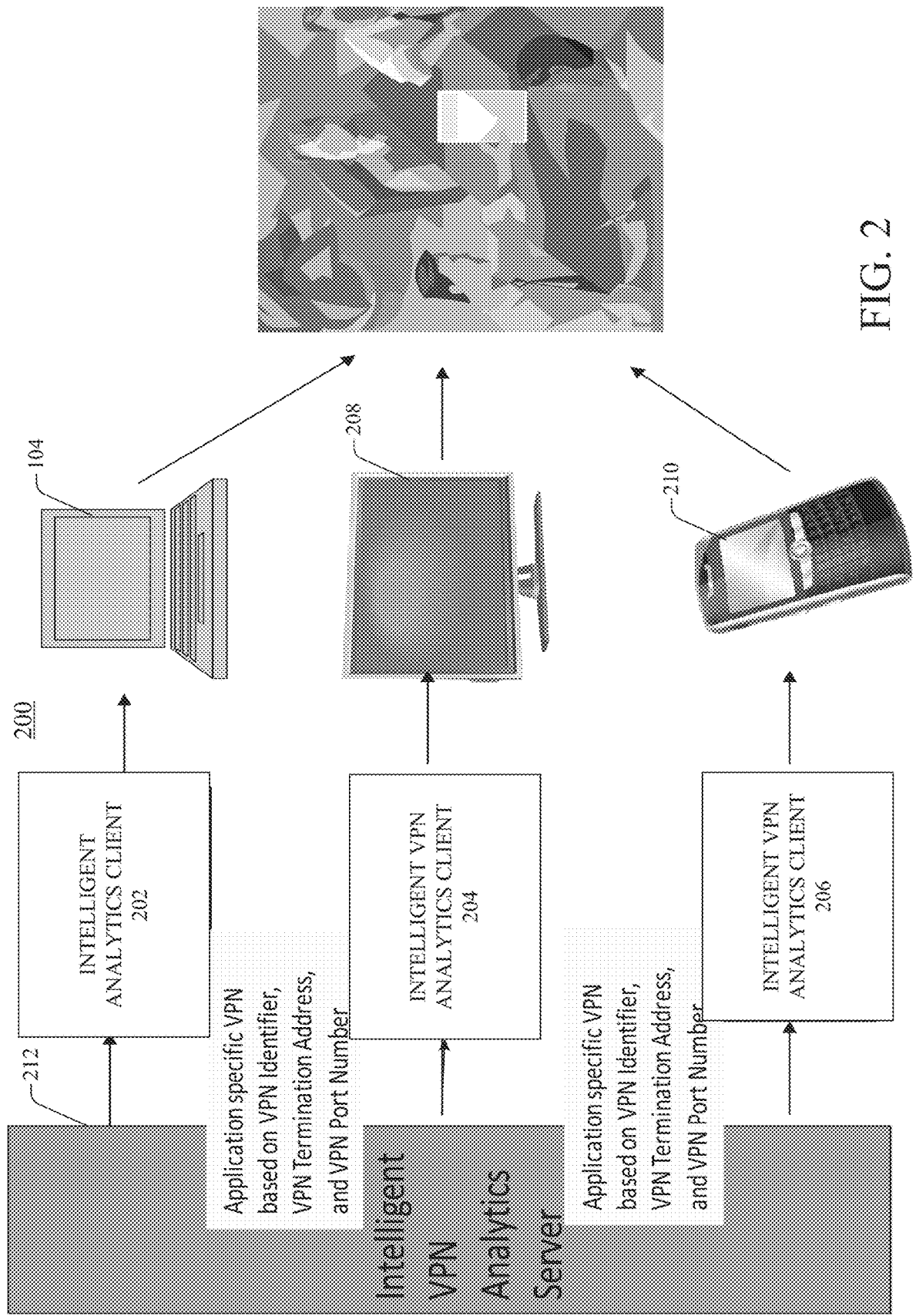
FIG. 2 illustrates an example block diagram of a system that facilitates dynamic VPN instantiation, aggregation and/or secured access to the cloud network device in accordance with one or more embodiments described herein.
Figure 3:
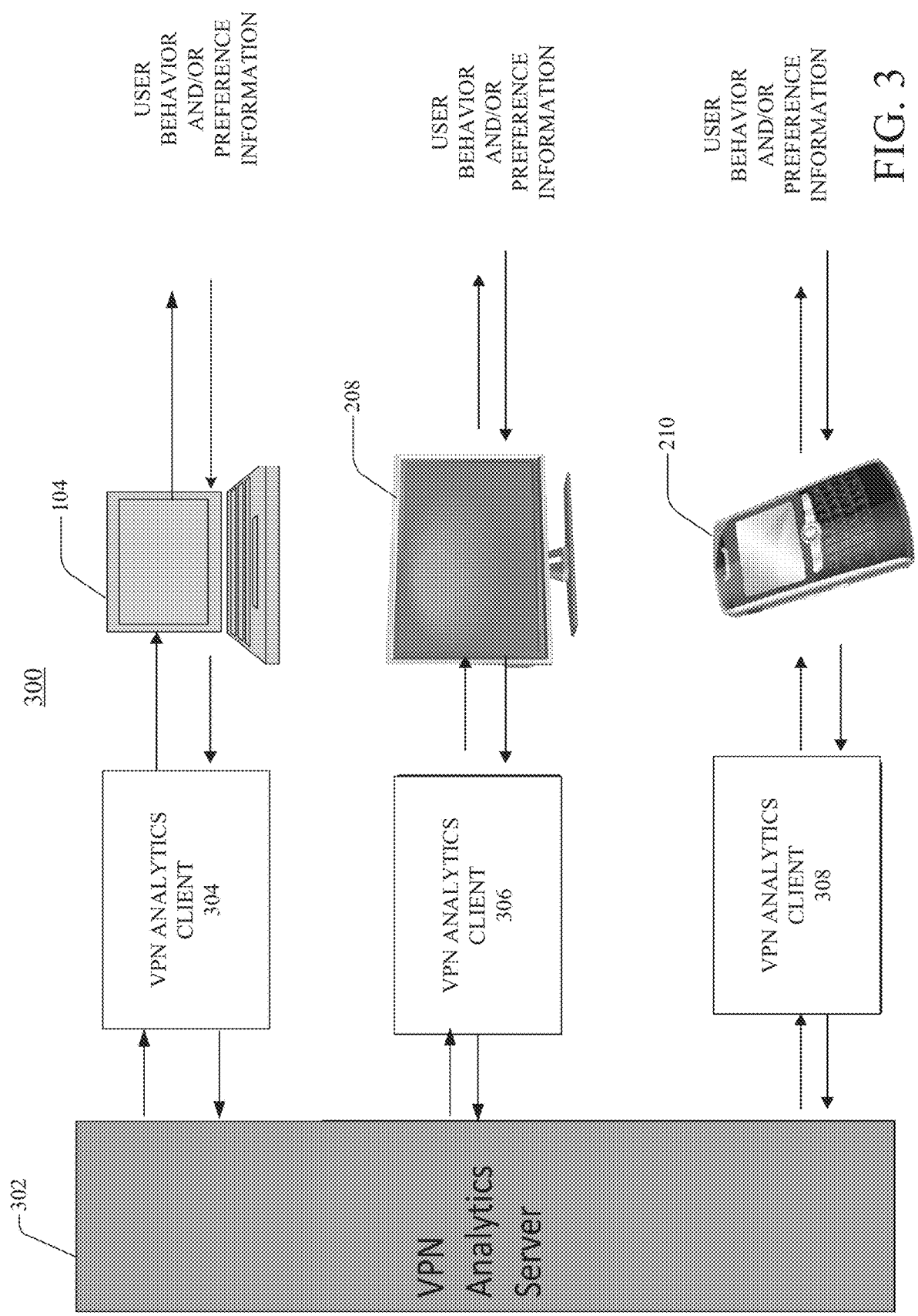
FIG. 3 illustrates another example block diagram of a system that facilitates dynamic VPN instantiation, aggregation and/or secured access to the cloud network device in accordance with one or more embodiments described herein.
Figure 4:
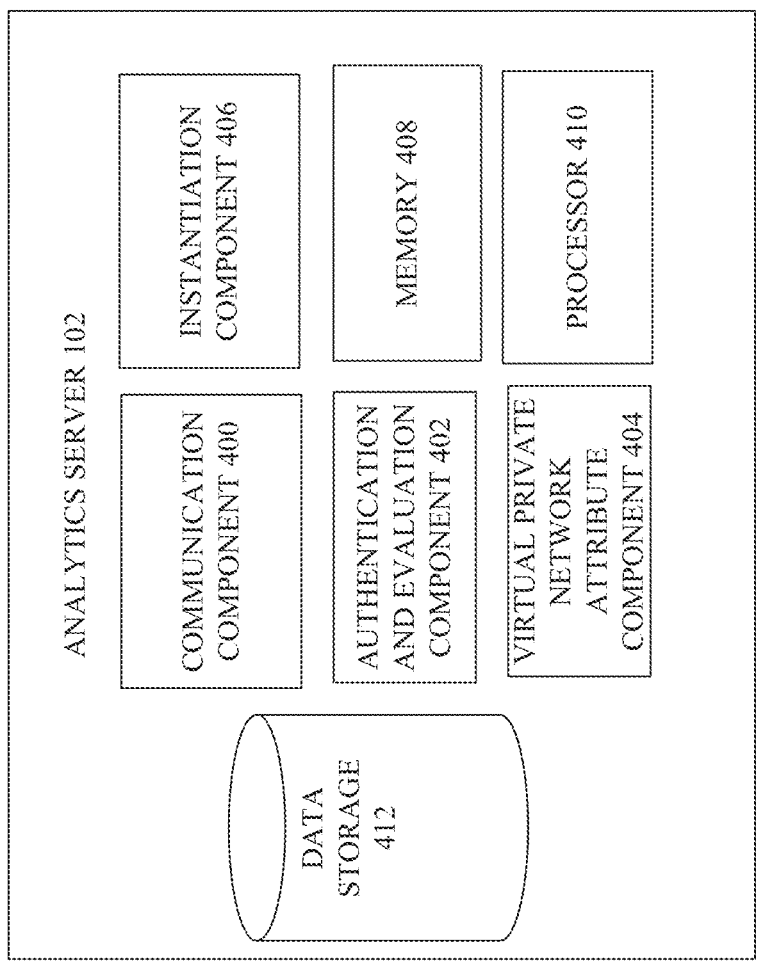
FIG. 4 illustrates an example block diagram of an analytics server that facilitates dynamic VPN instantiation, aggregation and/or secured access to the cloud network device in accordance with one or more embodiments described herein.
Figure 5:
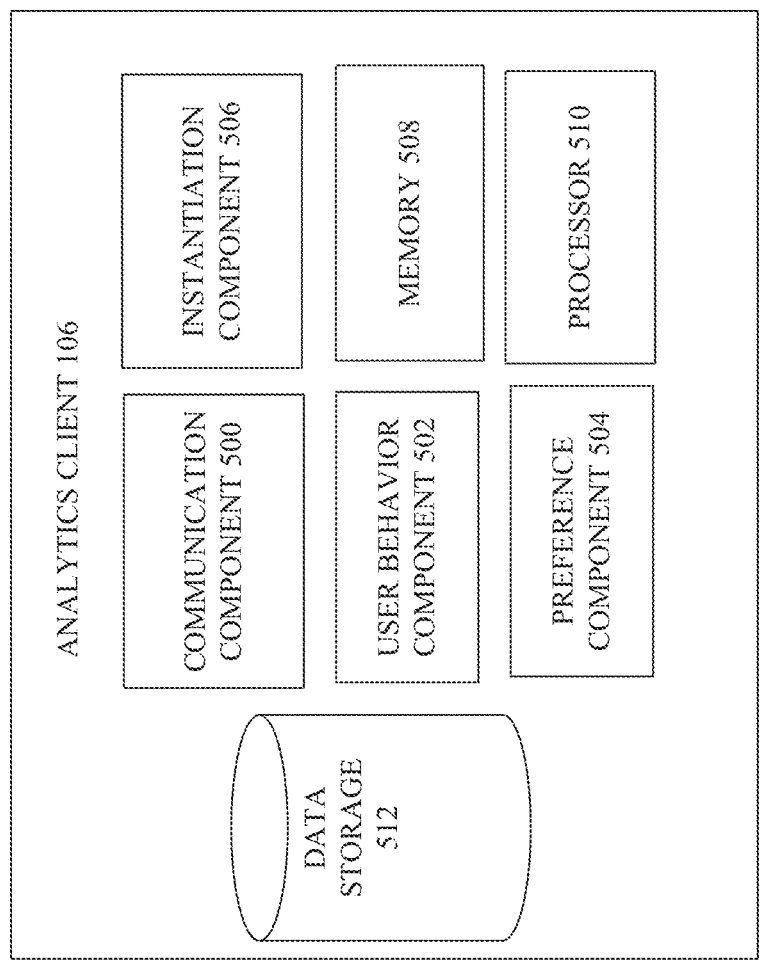
FIG. 5 illustrates an example block diagram of an analytics client that can facilitate dynamic VPN instantiation, aggregation and/or secured access to the cloud network device can be facilitated in accordance with one or more embodiments described herein.

FIG. 2 illustrates an example block diagram of a system that facilitates dynamic VPN instantiation, aggregation and/or secured access to the cloud network device in accordance with one or more embodiments described herein. FIG. 3 illustrates another example block diagram of a system that facilitates dynamic VPN instantiation, aggregation and/or secured access to the cloud network device in accordance with one or more embodiments described herein. FIG. 4 illustrates an example block diagram of an analytics server that facilitates dynamic VPN instantiation, aggregation and/or secured access to the cloud network device in accordance with one or more embodiments described herein. FIG. 5 illustrates an example block diagram of a device for which dynamic VPN instantiation, aggregation and/or secured access to the cloud network device can be facilitated in accordance with one or more embodiments described herein.

Figure 6:
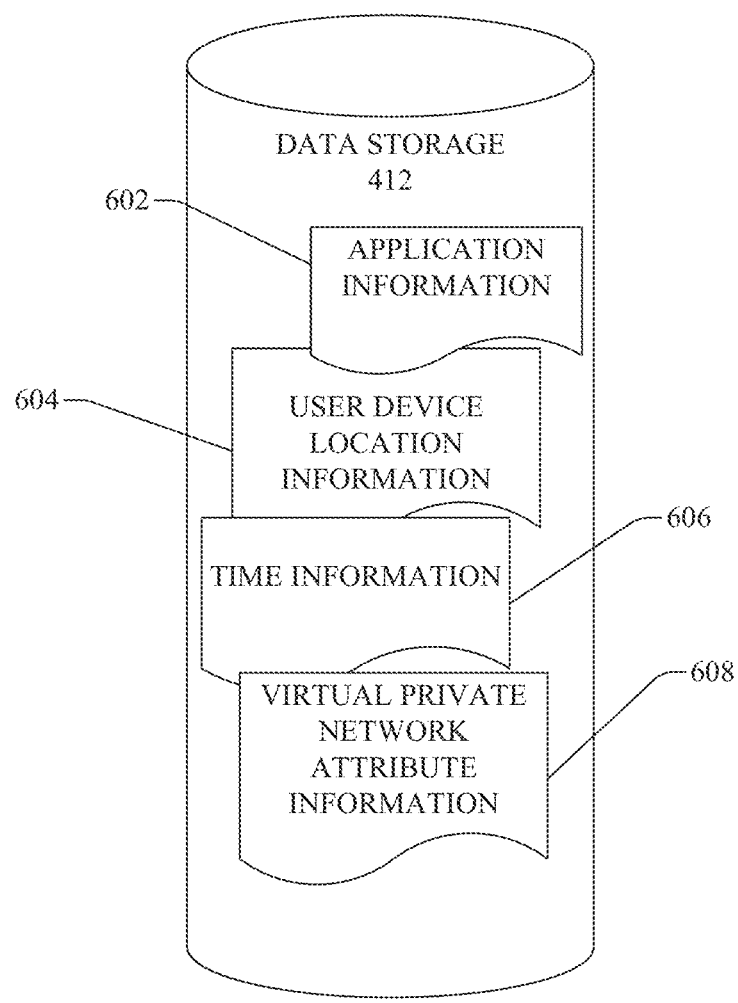
FIG. 6 illustrates an example block diagram of analytics server data storage in accordance with one or more embodiments described herein.

FIG. 6 illustrates an example block diagram of analytics server data storage in accordance with one or more embodiments described herein. Repetitive description of like elements employed in other embodiments described herein is omitted for sake of brevity.

Systems 200, 300 will be described with reference to FIGS. 1, 2, 3, 4, 5 and 6. In some embodiments, the analytics server 102 can comprise a communication component 400, an evaluation component 402, a VPN attribute component 404, an instantiation component 406, memory 408, processor 410 and/or data storage 412. One or more of communication component 400, an evaluation component 402, a VPN attribute component 404, an instantiation component 406, memory 408, processor 410 and/or data storage 412 can be electrically and/or communicatively coupled to one another to perform one or more functions of analytics server 102. In some embodiments, analytics client 106 can comprise a communication component 500, user behavior component 504, instantiation component 506, memory 508, processor 510 and/or data storage 512. One or more of analytics client 106 can comprise a communication component 500, user behavior component 504, instantiation component 506, memory 508, processor 510 and/or data storage 512 can be electrically and/or communicatively coupled to one another to perform one or more of the functions of analytics client 106. The components of analytics server 102 and/or analytics client 106 will be further described with reference to systems 200, 300.

As shown in FIG. 2, system 200 can comprise an intelligent VPN analytics server 212, intelligent analytics clients 202, 204, 206 for respective user devices 104, 208, 210 and user devices 104, 208, 210. In various embodiments, one or more of intelligent VPN analytics server 212, intelligent analytics clients 202, 204, 206 for respective user devices 104, 208, 210 and user devices 104, 208, 210 can be electrically and/or communicatively coupled to one another to perform one or more embodiments of system 200. In some embodiments, intelligent VPN analytics server 212 can include one or more of the structure and/or functionality of analytics server 102 of FIG. 1. In some embodiments, one or more of intelligent analytics client 202, 204, 206 can include the structure and/or the functionality of analytics client 106.

With reference to FIG. 2, intelligent analytics server 212 can authenticate (e.g., by communication component 400 and authentication and evaluation component 402) individual subscribers to allow the individual subscribers to automatically instantiate application-specific VPN at the user devices 104, 208, 210 based on VPN identifier, VPN termination address and/or VPN port number.

FIG. 6 illustrates an example block diagram of analytics server data storage in accordance with one or more embodiments described herein. As shown, the data storage 412 of the analytics server 102 can comprise a number of different types of information. In the example shown, the data storage 412 of the analytics server comprises application information 602 that includes information indicative of one or more applications accessible via the cloud network 112. The data storage 412 of the analytics server 106 can comprise user device location information 604, time information 606 and/or the VPN attribute information 606.

As shown in FIG. 2, the intelligent VPN analytics server 212 can output to a first intelligent analytics client 202 parameter information for instantiating an application-specific VPN for the user device 204. The parameter information can be determined by authentication and evaluation component 402. The parameter information can include VPN identifier, VPN termination IP address and/or VPN port number. The intelligent VPN analytics server 212 can output different information for a second intelligent analytics client 206 parameter information for instantiating an application-specific VPN for the user device 210, and the different parameter information can be determined by authentication and evaluation component 402. The parameter information can include VPN identifier, VPN termination IP address and/or VPN port number. The parameter information can be stored and/or updated in the VPN attribute component 404 in some embodiments. The parameter information can differ for the different user devices 208, 210 based on the particular application that the user device is executing or will be executing. A notification message can be generated by instantiation component 406 to notify the analytics client 106 of the commands for instantiating the application-specific VPN. The notification message can be transmitted to the analytics client 106 from the communication component 400 of the analytics server 102.

The communication component 500 of the analytics client 106 can receive the notification message and the instantiation component 506 can instantiate the application-specific VPN on the user device 104 based on the VPN attributes selected by the analytics server 102.

As shown in FIG. 3, system 300 can comprise a VPN analytics server 302, VPN analytics clients 304, 306, 308 for respective user devices 104, 208, 210 and user devices 104, 208, 210. In various embodiments, one or more of VPN analytics server 302, VPN analytics clients 304, 306, 308 for respective user devices 104, 208, 210 and user devices 104, 208, 210 can be electrically and/or communicatively coupled to one another to perform one or more embodiments of system 300. In some embodiments, VPN analytics server 302 can include one or more of the structure and/or functionality of analytics server 102 of FIG. 1 and/or intelligent VPN analytics server 212 of FIG. 2. In some embodiments, one or more of intelligent analytics client 304, 306, 308 can include the structure and/or the functionality of analytics client 106 and/or intelligent VPN analytics clients 202, 204, 206.

With reference to FIG. 3, the VPN analytics client 304 (e.g., the user behavior component 502 and/or the preference component 504 of the analytics client 106 or of the VPN analytics server 304) can query, measure and/or update user behavior and/or preference associated with a user of user device 104. The VPN analytics server 302 can receive and/or retrieve such information from the VPN analytics client 304 (via a communication between the communication component 500 and communication component 400). In some embodiments, the VPN analytics server 302 can validate the VPN client information (e.g., by authentication and evaluation component 402).

In some embodiments, the VPN analytics server 302 can continually measure (e.g., by the authentication and/or evaluation and/or dynamically update on the fly application-specific VPN attributes for a VPN between a network (e.g., cloud network) to which the VPN analytics server 302 is communicatively coupled and a network (not shown) to which the user device 104 is communicatively coupled. In some embodiments, the VPN attributes can include, but are not limited to, VPN identifier, VPN termination IP address and/or VPN port number. The VPN analytics server 302 can update the application-specific VPN attributes by sending such information to the VPN analytics client 304, which can employ such information for instantiation of an application-specific VPN.

In some embodiments, the analytics VPN server 302 can continually query the VPN analytics client 304 and/or update user behavior and/or preference information according to one or more of the present location of a user device (e.g., user device 104), time of day at which the user device 104 is or will be executing the application and/or quality of service requirement for the application or specification for the application or quality of service paid by a user/subscriber associated with the user device 104 or request of a user device 104 executing the application or that will be executing the application.

As shown, in some embodiments, the system 300 can include a combination of the VPN analytics server 302 (which can be located in and/or communicatively coupled to a cloud network) and the VPN analytics client 304 on the user device 104. The VPN analytics server 302 can dynamically instantiate an application-specific VPN between the user device 104 and the cloud network (not shown) of system 300. In some embodiments, the analytics server 302 can instantiate the VPN virtual network function, which can automatically assign and/or allocate selective VPN attributes for each service request: VPN identifier, VPN termination IP address, and/or VPN port number.

In some embodiments, the VPN analytics server 302 can continually measure and/or dynamically update the application-specific VPN according to the change of user behavior and/or user preference.

Updating can be based on current location of the user device, time of day of access of the user device and/or service requirement for the application utilized. The application-specific VPN attributes updated can include, but are not limited to, VPN identifier, VPN termination IP address and/or VPN port number. The application-specific VPN attributes can be updated by the intelligent analytics server in the cloud network continually sending notification messages to the analytics client on the user device. The notification messages can include information regarding application-specific VPN attributes to be updated and/or can cause those application-specific VPN attributes to be updated.

In some embodiments, systems 100, 200 and/or 300 can facilitate dynamic analytics-based VPN instantiation and/or aggregation can be provided for secured access to the cloud network by the user device. In the systems 200, 300 can include multiple users and/or user devices (e.g., such as users associated with user devices 104, 208, 210). In some embodiments, each user device (or, one or more user devices 104, 208, 210) can comprise a distinct collection of detected user behavior and/or preference information. The user behavior and/or preference information can be constantly updated according to the location of the corresponding user device, the time of day of the access of the user device (or the time of day that the user device is executing or will execute the application) and/or the application being executed or that will be executed over the VPN on the user device.

In some embodiments, the user device can collect and/or determine the user behavior and/or preference information and send the same to the analytics client. In some embodiments, the information can be retrieved from the user device by the analytics client.

In some embodiments, the analytics client can collect and/or determine the user behavior and/or preference information. In some embodiments, the information can be retrieved from the analytics client by the analytics server 302.

There can be a wide selections of applications accessible by the cloud for use by the user device. Each application can be associated with specific service requirements (e.g., performance, QoS, data rate, etc).

In some embodiments, the analytics server 302 can continually (or from time to time, or based on a defined condition occurring) communicate with the analytics agent that is stored in or accessible over a network by the user device to collect user behavior and/or preference information according to location, time of day and/or application being executed or that will be executed or that is requested by the user device. In some embodiments, the application can be NETFLIX, VoIP or another application).

Accordingly, in some embodiments, the user device can transmit a request for an application located in or accessible via the cloud network. The user device can launch the application request on behalf of a user of the user device, for example. The user device can collect user behavior information and/or preference information and send the information to the analytics client in some embodiments. The information transmitted, in some embodiments, can be or include, location of the user device, time of day of the request and/or application requested. The analytics client for the user device can transmit the user preference information to the analytics server.

In some embodiments, the analytics client can send service information (e.g., quality of service information) for the application and/or to which the user has subscribed) and/or user behavior/preference information to the analytics server. The analytics server can measure the user behavior and/or preference information according to location, time of day and/or application.

In some embodiments, the analytics server can a notification message (e.g., VPN notification message) to the corresponding analytics client residing on or communicatively coupled to the user device. The notification message can comprise selective VPN attributes for each service request.

Accordingly, the analytics client can launch an application-specific VPN on behalf of the user. The analytics client can allow the user/user device to reach to the cloud according to the specific user behavior and/or user preference information as well as service application requirement according to location, time of day and/or application. Accordingly, the analytics client can pair with the analytics server in the cloud to continually modify the application-specific VPN for each service request based on user behavior change and/or application performance. The application-specific VPN can update one or more of the VPN identifier, VPN termination IP address, and/or VPN Port Number on the fly as information is obtained and/or measured (and/or as user behavior and/or preference information is obtained by the analytics server and/or measured).

Accordingly, one or more embodiments described herein can provide for VPN instantiation and/or aggregation. For example, one or more embodiments can provide dynamic on the fly VPN instantiation and/or aggregation as the most secured access to a cloud network. Namely, one or more embodiments can leverage the combination analytics server in the cloud network and analytics client on the user device to: dynamically instantiate an application-specific VPN between the user device and the cloud network, continually update the application-specific VPN according to the change of user behavior and/or preference information (e.g., based on current location, time of day and/or service requirement). One or more embodiments can provide an analytics server in the cloud network to continually measure and/or dynamically update on the fly the application-specific VPN attributes of VPN identifier, VPN termination IP address, and/or VPN port number. One or more embodiments can provide an analytics server in a cloud network that can continually send one or more notification messages to the analytics client in order to dynamically update on the fly the application-specific VPN attributes.

Figure 7:
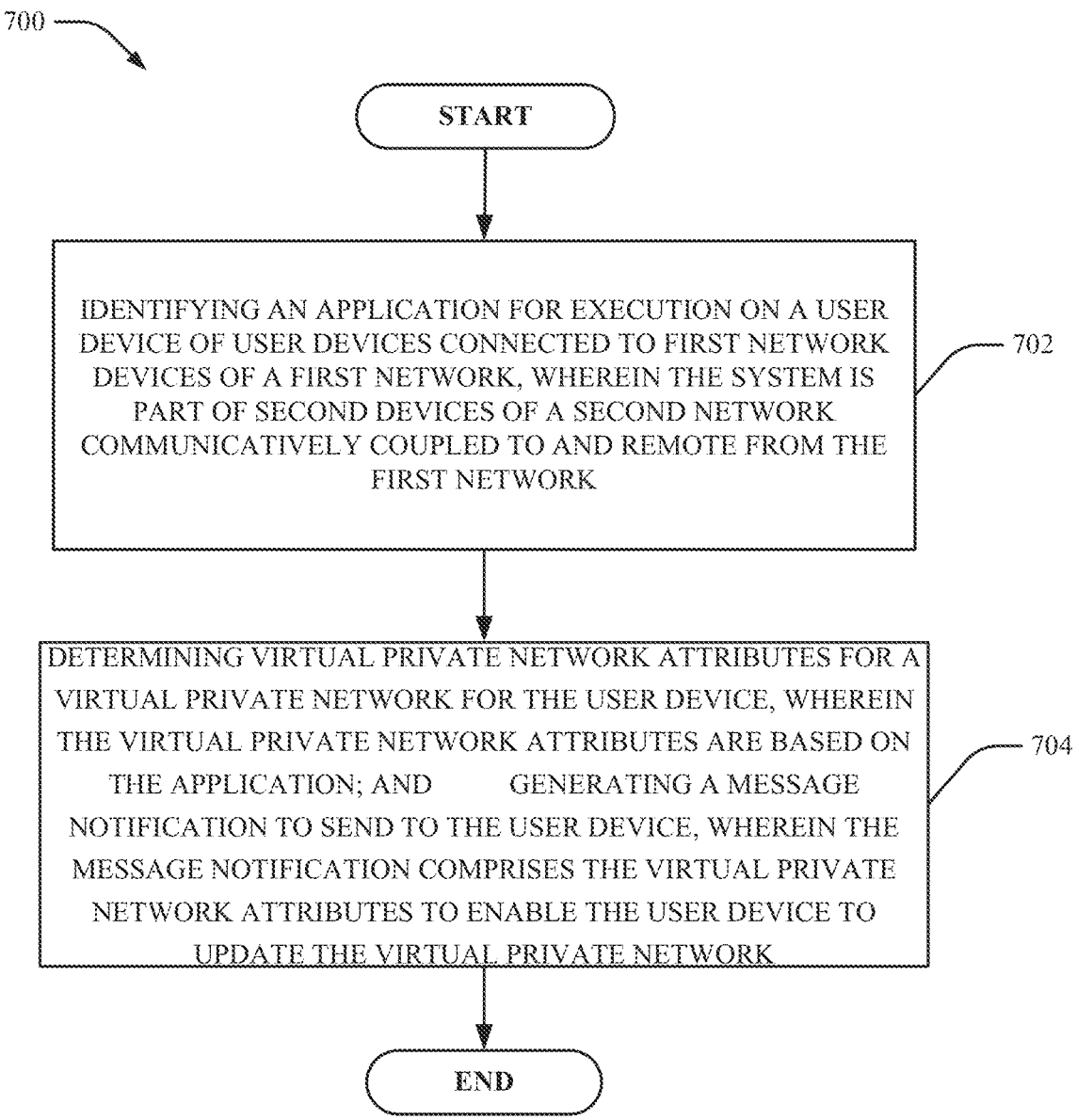
FIGS. 7, 8 and 9 are flowcharts of methods that facilitate dynamic VPN instantiation, aggregation and/or secured access to the cloud network device in accordance with one or more embodiments described herein.
Figure 8:
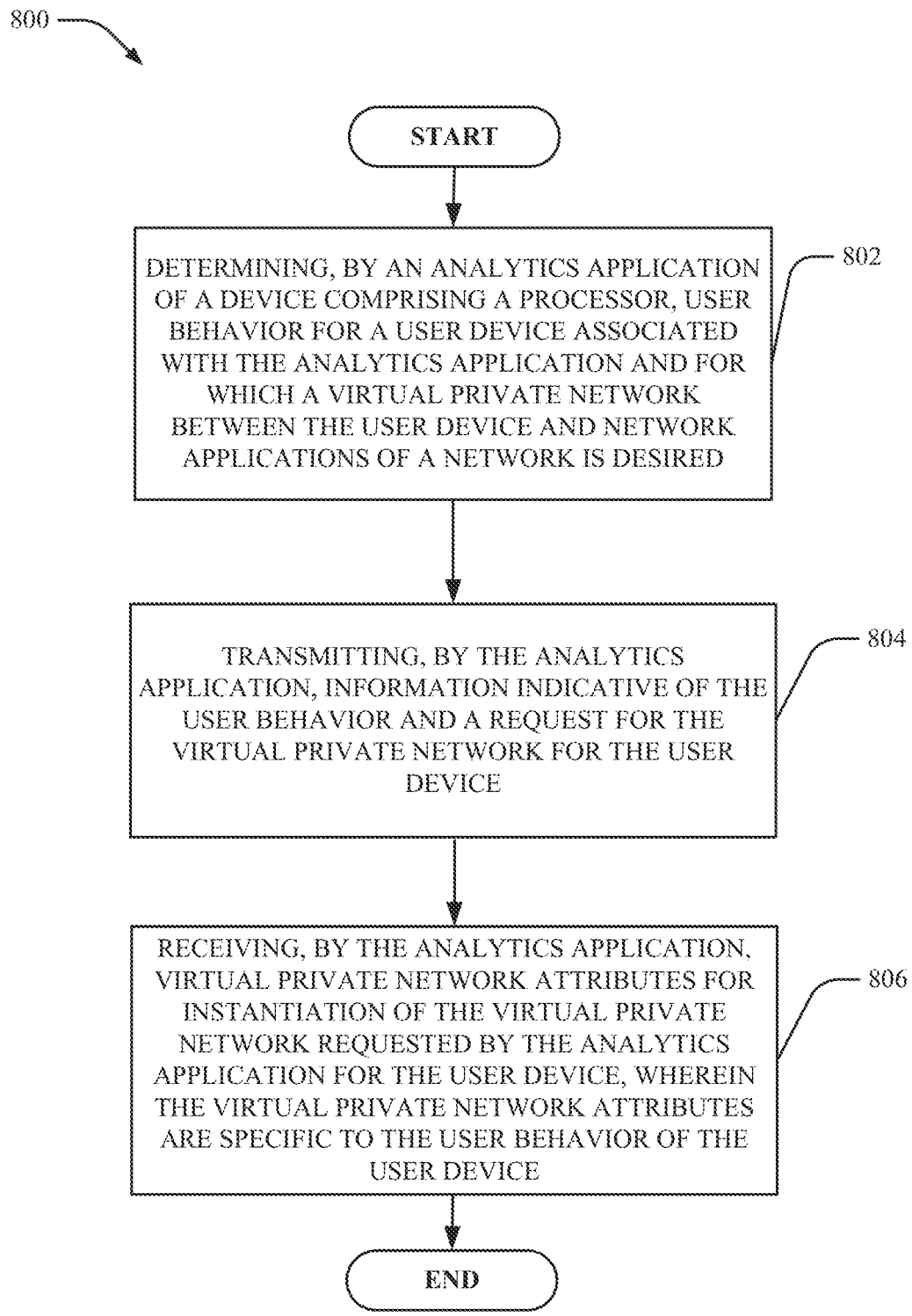
Figure 9:
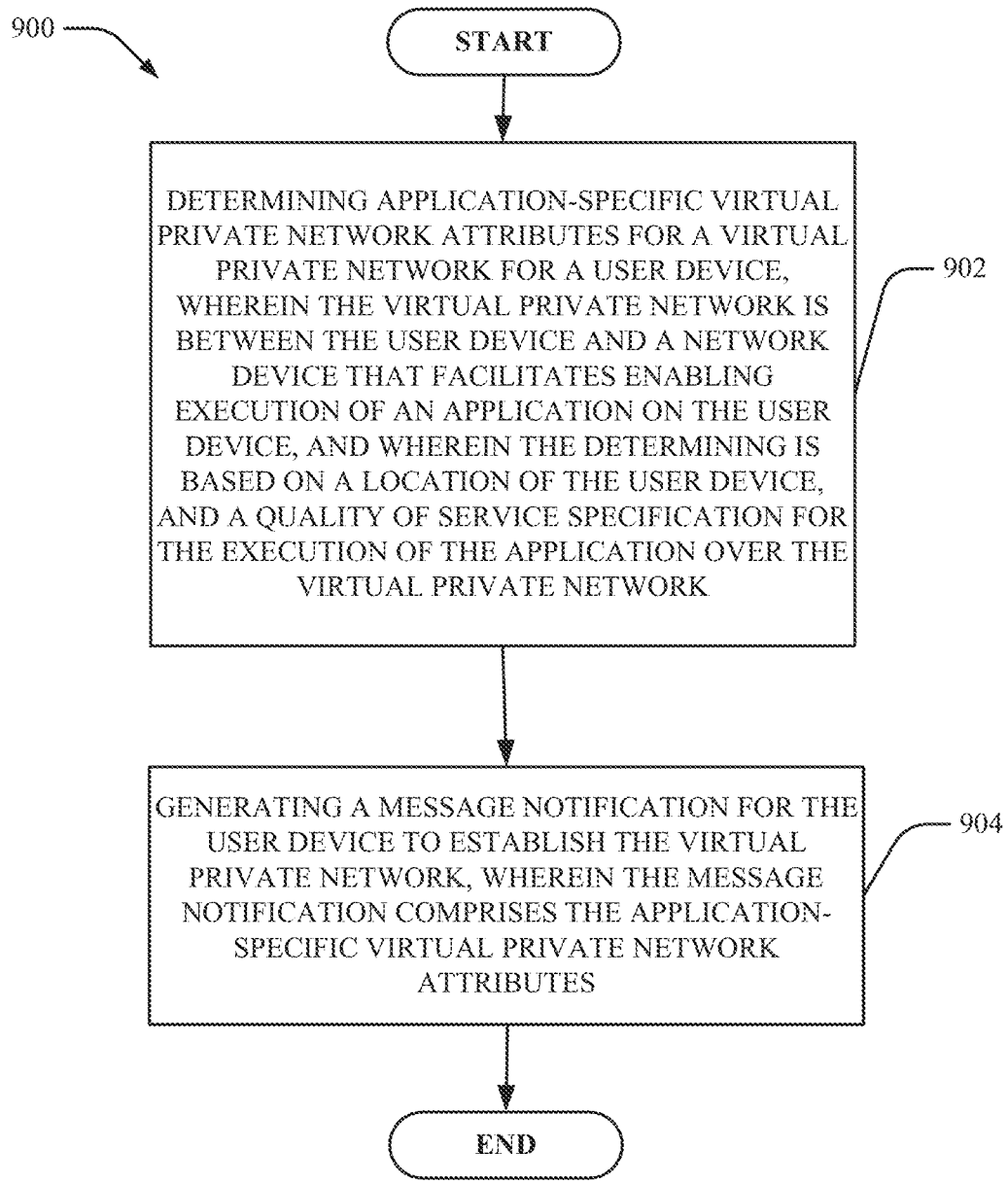

FIGS. 7, 8 and 9 are flowcharts of methods that facilitate dynamic VPN instantiation, aggregation and/or secured access to the cloud network device in accordance with one or more embodiments described herein. Turning to FIG. 7, at 702, method 700 can comprise identifying an application for execution on a user device of user devices connected to first network devices of a first network, wherein the system is part of second devices of a second network communicatively coupled to and remote from the first network. At 704, method 700 can comprise determining virtual private network attributes for a virtual private network for the user device, wherein the virtual private network attributes are based on the application; and generating a message notification to send to the user device, wherein the message notification comprises the virtual private network attributes to enable the user device to update the virtual private network.

In some embodiments, although not shown, the method 700 can also comprise receiving, from an analytics application executing on the user device, user behavior information indicative of user behavior at the user device, and based upon which the analytics application updates the user device according to the message notification, and wherein the receiving is performed prior to the generating. In some embodiments, the receiving, the generating and the transmitting can be performed multiple times.

In some embodiments, the user behavior information comprises the application for the execution on the user device, a time of day of access of the application by the user device, and a location of the user device within the first network of the first network devices.

In some embodiments, although not shown, method 700 can comprise transmitting the message notification to the analytics application of the user device. The method can also comprise instantiating the virtual private network on the user device based on the message notification.

In some embodiments, although not shown, method 700 can comprise validating user behavior information received from the analytics application prior to the determining virtual private network attributes.

In some embodiments, the virtual private network couples the first network devices of the first network with the second network devices of the second network. In some embodiments, the virtual private network attributes comprise a virtual private network identifier and a virtual private network termination internet protocol address. In some embodiments, the virtual private network attributes comprise a virtual private network identifier and a virtual private network port number.

In some embodiments, the application is a first application, wherein the user device is a first user device, wherein the message notification is a first message notification, and wherein the operations further comprise: identifying a second application for execution on a second user device of the user devices; determining second virtual private network attributes for a second virtual private network for the second user device, wherein the second virtual private network attributes are specific to the second application; and generating a second message notification for the second user device, wherein the second message notification comprises the second virtual private network attributes to enable the second user device to update a second virtual private network of the second user device.

In some embodiments, the second application and the first application differ resulting in the second virtual private network attributes being different from the virtual private network attributes. In some embodiments, the second virtual private network attributes for the second user device differ from the virtual private network attributes for the user device.

Turning now to FIG. 8, at 802, method 800 can comprise determining, by an analytics application of a device comprising a processor, user behavior for a user device associated with the analytics application and for which a virtual private network between the user device and network applications of a network is desired. At 804, method 800 can comprise transmitting, by the analytics application, information indicative of the user behavior and a request for the virtual private network for the user device. At 806, method 800 can comprise receiving, by the analytics application, virtual private network attributes for instantiation of the virtual private network requested by the analytics application for the user device, wherein the virtual private network attributes are specific to the user behavior of the user device.

In some embodiments, the user behavior comprises an application identifier identifying an application for execution on the user device, a time of day of access of the application by the user device, and a location of the user device within the network. In some embodiments, the virtual private network attributes comprise a virtual private network identifier and a virtual private network termination internet protocol address for the virtual private network. In some embodiments, the virtual private network attributes comprise a virtual private network identifier and a virtual private network port number for the virtual private network.

Turning now to FIG. 9, at 902, method 900 can comprise determining application-specific virtual private network attributes for a virtual private network for a user device, wherein the virtual private network is between the user device and a network device that facilitates enabling execution of an application on the user device, and wherein the determining is based on a location of the user device, and a quality of service (e.g., bit rate, delay, performance) specification for the execution of the application over the virtual private network. At 904, method 900 can comprise generating a message notification for the user device to establish the virtual private network, wherein the message notification comprises the application-specific virtual private network attributes.

In some embodiments, the determining is further based on a time of day that the virtual private network is to be instantiated. In some embodiments, the application-specific virtual private network attributes comprise a virtual private network identifier, a virtual private network termination internet protocol address, and a virtual private network port number.

In some embodiments, the determining and the generating are performed repeatedly to update the application-specific virtual private network attributes.

Figure 10:
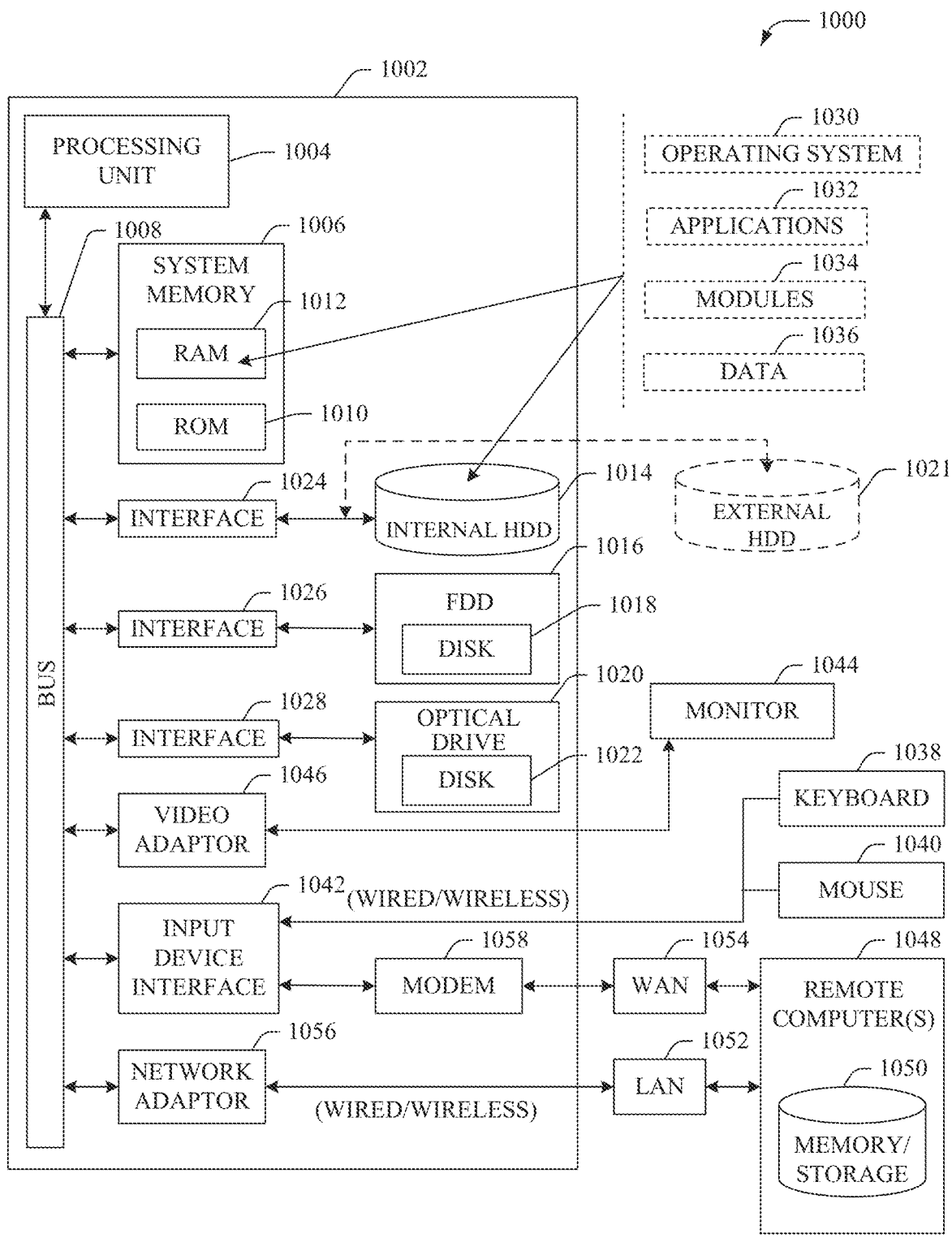
FIG. 10 illustrates a block diagram of a computer that can be employed in accordance with one or more embodiments.

FIG. 10 illustrates a block diagram of a computer that can be employed in accordance with one or more embodiments. Repetitive description of like elements employed in other embodiments described herein is omitted for sake of brevity.

In some embodiments, the computer can be or be included within any number of components described herein comprising, but not limited to, ESP system 106, local ESP system 140, third-party carrier/vendor device 154 and/or API management function device 116 (or any components of ESP system 106, local ESP system 140, third-party carrier/vendor device 154 and/or API management function device 116).

In order to provide additional text for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1010 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A communication device can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/ storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=\text{confidence}(\text{class})$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components including the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to include, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
identifying an application for execution on a user equipment of a group of user equipment connected to first network equipment associated with a first network, wherein the system is part of second network equipment, associated with a second network, communicatively coupled to and remote from the first network equipment;
determining virtual private network attributes for instantiation and modification of a virtual private network, wherein the virtual private network attributes are determined based on the application and determined based on a first time of day of access of the application by the user equipment; and
generating an application-specific message notification to the user equipment, wherein the application-specific message notification comprises the virtual private network attributes for the instantiation and the modification of the virtual private network and causes the user equipment to update the virtual private network,
wherein user behavior information for the user equipment comprises the time of day of access of the application by the user equipment, the application for the execution on the user equipment, and a first location of the user equipment within the first network,
wherein the virtual private network attributes have been updated to updated virtual private network attributes distinct from the virtual private network attributes,
wherein the updated virtual private network attributes were updated based on a second time of day of access of the application by the user equipment and a second location of the user equipment, and
wherein the generating is performed multiple times.

2. The system of claim 1, wherein the operations further comprise:
receiving, from an analytics application executing on the user equipment, user behavior information indicative of user behavior at the user equipment, and based upon which the analytics application updates the user equipment according to the application-specific message notification, and wherein the receiving is performed prior to the generating.

3. The system of claim 2, wherein the operations further comprise:
validating user behavior information received from the analytics application prior to the determining of the virtual private network attributes.

4. The system of claim 1, wherein the operations further comprise:
transmitting the application-specific message notification to an analytics application of the user equipment; and
instantiating the virtual private network on the user equipment based on the application-specific message notification.

5. The system of claim 1, wherein the virtual private network couples the first network equipment with the second network equipment.

6. The system of claim 1, wherein the virtual private network attributes comprise a virtual private network identifier and a virtual private network termination internet protocol address.

7. The system of claim 1, wherein the virtual private network attributes comprise a virtual private network identifier and a virtual private network port number.

8. The system of claim 1, wherein the application is a first application, wherein the user equipment is a first user equipment, wherein the application-specific message notification is a first application-specific message notification, and wherein the operations further comprise:
identifying a second application for execution on a second user equipment of the group of user equipment;
determining second virtual private network attributes for a second virtual private network for the second user equipment, wherein the second virtual private network attributes are specific to the second application; and
generating a second message notification for the second user equipment, wherein the second message notification comprises the second virtual private network attributes to enable the second user equipment to update a second virtual private network of the second user equipment.

9. The system of claim 8, wherein the second application and the first application differ resulting in the second virtual private network attributes being different from the virtual private network attributes.

10. The system of claim 8, wherein the second virtual private network attributes for the second user equipment device differ from the virtual private network attributes for the first user equipment.

11. A method, comprising:
determining, by an analytics application of a device comprising a processor, user behavior information indicative of user behavior for a user device associated with the analytics application and for which a virtual private network between the user device and network applications enabled via a network is desired;
transmitting, by the analytics application, the user behavior information indicative of the user behavior and a request for the virtual private network for the user device; and
receiving, by the analytics application, virtual private network attributes for instantiation of the virtual private network requested by the analytics application for the user device, wherein the virtual private network attributes are updated at specified times, specific to the user behavior of the user device and a first group of virtual private network attributes, based on a first time of day at which the user device is to execute a network application of the network applications, wherein a second group of virtual private network attributes is received at a second time of day after the first time, and wherein the second group of virtual private network attributes is based on a second time of day at which the user device is to execute the network application,
wherein the user behavior information for the user device comprises the first time of day, the network application for execution on the user device, and a first location of the user device within the network, wherein the virtual private network attributes are updated to updated virtual private network attributes distinct from the virtual private network attributes, and wherein the updated virtual private network attributes were updated based on the second time of day and a second location of the user equipment.

12. The method of claim 11, wherein the user behavior information comprises an application identifier identifying the network application for the execution on the user device.

13. The method of claim 11, wherein the virtual private network attributes comprise a virtual private network identifier and a virtual private network termination internet protocol address for the virtual private network.

14. The method of claim 11, wherein the virtual private network attributes comprise a virtual private network identifier and a virtual private network port number for the virtual private network.

15. A non-transitory machine-readable medium, comprising executable instructions that, when executed by a processor, facilitate performance of operations, comprising:

determining a first group of application-specific virtual private network attributes for instantiation and aggregation of a virtual private network for a user device, wherein the virtual private network is between the user device and network equipment that facilitates enabling execution of an application on the user device, and wherein the first group of application-specific virtual private network attributes for the instantiation and the aggregation of the virtual private network for the user device are determined based on a first location of the user device, and a first quality of service specification for the execution of the application over the virtual private network;

validating user behavior information received from an analytics application prior to the determining of the first group of application-specific virtual private network attributes, wherein the validating is performed for a defined subscriber for the user device from a group of subscribers, the group of subscribers comprising a first defined subscriber for the user device and a second defined subscriber for the user device different from the first defined subscriber; and generating a message notification for the user device to establish the virtual private network based on the first group of application-specific virtual private network attributes, wherein the message notification comprises the application-specific virtual private network attributes, wherein the determining and the generating are performed repeatedly to update the first group of application-specific virtual private network attributes to a second group of application-specific virtual private network attributes, wherein the second group of virtual private network attributes is based on a second location of the user device and a second quality of service specification for the execution of the application, wherein the user behavior information comprises a first time of day of access of the application by the user device, the application for the execution on the user device, and the first location of the user device, wherein the virtual private network attributes are updated based on a second time of day of access of the application by the user device and a second location of the user device, resulting in updated virtual private network attributes distinct from the virtual private network attributes, and wherein the generating is performed multiple times.

16. The non-transitory machine-readable medium of claim 15, wherein the determining is further based on a specified time of day that the virtual private network is to be instantiated.

17. The non-transitory machine-readable medium of claim 15, wherein the first group of application-specific virtual private network attributes comprise a virtual private network identifier, a virtual private network termination internet protocol address, and a virtual private network port number.

18. The non-transitory machine-readable medium of claim 15, wherein the determining and the generating are performed the multiple times to update the first set of the application-specific virtual private network attributes to the second set of the application-specific virtual private network attributes based on a first specified time of day that the virtual private network is to be instantiated and a second specified time of day that the virtual private network is to be instantiated.

19. The non-transitory machine-readable medium of claim 15, wherein the operations further comprise:

transmitting the message notification to the analytics application of the user device.

20. The system of claim 1, wherein the operations further comprise:

transmitting the application-specific message notification to an analytics application of the user equipment.

* * * * *